Jan. 20, 1959  M. COX  2,869,830
METHOD AND APPARATUS FOR HEATING FLUID
Filed Jan. 22, 1953

Inventor
Martin Cox
By
Stevens, Davis, Miller & Mosher
his Attorneys

United States Patent Office 2,869,830
Patented Jan. 20, 1959

2,869,830

METHOD AND APPARATUS FOR HEATING FLUID

Martin Cox, Farnborough, England, assignor to Power Jets (Research and Development) Limited, London, England, a British company Application January 22, 1953, Serial No. 332,608

Claims priority, application Great Britain March 5, 1948

8 Claims. (Cl. 257—1)

This invention is concerned with methods and apparatus for heating one fluid by another indirectly by the transfer of heat through an intervening wall.

This application is a continuation-in-part of application Serial No. 77,643, filed February 21, 1949, and now abandoned.

The invention is considered to have particular but not exclusive application for example to fluid heaters for indirectly heating the gaseous working fluid for turbines by gaseous combustion products so as to avoid contamination of the turbine working fluid. By reason of the high temperature to which the heated fluid is desirably raised and the even higher temperature of the heating fluid in such fluid heaters, possibility arises that the temperature of the intervening wall may be so high as to result for example in excessive oxidation of the wall. It is therefore desirable, a value of the wall temperature having been determined at which the rate of oxidation of the wall is not excessive, that this temperature should not be exceeded anywhere on the wall.

On the other hand, by reason of the need of economy in size in such a fluid heater, the wall temperature at any point should be as high as possible so that the greatest possible amount of heat is imparted to the heated fluid from a given surface area of the wall.

Accordingly it is desirable that a fluid heater shall operate in such a manner that the temperature everywhere on the wall is at substantially the highest possible value, this value being the maximum allowable temperature having regard to the permissible rate of oxidation of the wall and like physical considerations. An object of the invention is to provide for the operation of a fluid heater whereby a substantial part of the heat exchange is effected through a wall or walls maintained at approximately constant temperature.

Now the temperature of the wall at any point lies between the temperatures of the respective fluids on either side of the wall at that point. As a consequence of the exchange of heat between the fluids, the temperature of each fluid changes at successive points along the wall.

If, between successive points along the wall, the temperatures of the respective fluids change in the same sense (as in the case of a countercurrent heat exchanger), the wall temperature will tend to change in a like sense. On the other hand if the temperatures of the fluids change in opposite senses (as in the case of a concurrent heat exchanger) there will be a much less tendency for the wall temperature to change. It follows therefore that the achievement of the object aforementioned is facilitated if the general directions of flow of the heating and heated fluids are concurrent. However, in a fluid heater employing a concurrent flow heat exchanger, the temperature changes of the respective fluids between successive points along the wall are inversely proportionate (by virtue of the conservation of heat in the fluids) to the respective heat capacities of the two fluid streams, the heat capacity of a fluid stream being the product of its rate of mass flow and its specific heat. Consequently when the heat capacities of the fluid streams on each side of the wall are disproportionate the respective fluid temperature changes are similarly disproportionate and this tends to produce a variation in wall temperature. This effect is particularly pronounced in a concurrent flow gas turbine fluid heater where, in order to reduce the power losses associated with the combustion process producing the heating fluid, it is desirable to maintain the mass flow rate of the combustion supporting fluid at a minimum consistent with complete combustion of the fuel. As a consequence the mass flow rate of the combustion products forming the heating fluid is of a similarly low order and may be substantially disproportionate to the mass flow rate of the fluid to be heated, with correspondingly disproportionate heat capacities.

The present invention is accordingly concerned more particularly with the achievement of the aforementioned object where the heat capacities of the heated and heating fluid are substantially disproportionate. The manner in which this is accomplished will be readily apparent from the following description with reference to the accompanying drawing of a gas turbine fluid heater embodying the invention.

Figure 1:
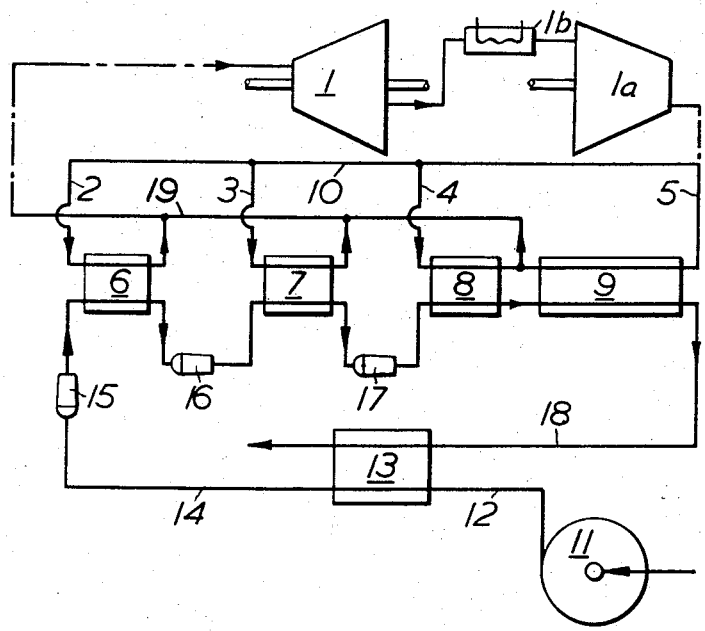
Figure 1 is a diagrammatic representation of a gas turbine plant incorporating the fluid heater showing the various components of the fluid heater and their interconnections.

In Figure 1 the turbine 1 employs air as a working fluid and this air is continuously circulated in a closed circuit which is represented generally by chain dotted lines and where it constitutes part of the heater circuit by full lines. The turbine 1 is operatively connected to drive a compressor 1a and the aforesaid closed circuit includes the turbine 1, a heat dump means 1b, a compressor 1a and a heating means as described below. The air is indirectly heated prior to its admission to the turbine 1 by the transfer of heat from gaseous combustion products. It is assumed that the mass flow rate of air in the closed circuit is approximately four times the mass flow rate of the heating gas.

The air in the closed circuit is divided prior to admission to the fluid heater, three quarters of the total air mass flow passing along the supply manifold 10 and the remainder passing along the connection 5. The manifold 10 has three discharge connections 2, 3 and 4 to the respective heated fluid inlets of three concurrent flow heat exchangers 6, 7, and 8. The heated fluid outlet of each of these heat exchangers are connected to a discharge manifold 19 which is connected in turn to the inlet of turbine 1. The air connection 5 is to the heated fluid inlet of a countercurrent flow heat exchanger 9 having its heated fluid outlet connected to the discharge manifold 19. The arrangement is accordingly such that the heated fluid paths of the heat exchangers 6, 7, 8 and 9 each accommodate a mass flow rate of air approximately equal to that of the heating gas.

The heating gas circuit comprises a fan 11 inspiring air from the atmosphere and having a discharge connection 12 to the heated fluid inlet of an economiser 13 which is conveniently a rotary regenerative heat exchanger. The heated fluid outlet of the economiser 13 has a discharge connection 14 to a first combustion chamber 15 in which a quantity of fuel is burnt in the air. The combustion chamber 15 discharges its combustion products to the heating fluid inlet of the concurrent flow heat exchanger 6 of which the heating fluid outlet is connected to a second combustion chamber 16 wherein a further quantity of fuel is burnt in the heating gas. The combustion chamber 16 discharges to the heating fluid inlet of the concurrent flow heat exchanger 7 of which the heating fluid outlet is connected to a third combustion chamber 17 wherein a further quantity of fuel is burnt in the heating gas. The combustion chamber 17 discharges to the heating fluid inlet of the concurrent flow heat exchanger 8 of which the heating fluid outlet is connected to the heating fluid inlet of the countercurrent heat exchanger 9. The heating fluid outlet of the latter has a discharge connection 18 to the heating fluid inlet of the economiser 13.

It is apparent that the mass flow rates of the heated turbine air and the heating gas are similar in each of the concurrent flow heat exchangers 6, 7 and 8 and consequently the temperature of their heat exchanging walls may be maintained approximately constant. It is assumed that the turbine air is supplied to the heater through the connections 2, 3, 4 and 5 at a temperature of 400° C. and must be delivered to the turbine at 750° C., and that the maximum allowable wall temperature is 800° C. The heating gas is raised in each of the combustion chambers 15, 16 and 17 to a temperature of 1200° C. and is discharged from each concurrent flow heat exchanger at 884° C. The resulting wall temperature at both the inlet and the outlet ends of each of the concurrent flow heat exchangers 6, 7 and 8 is 800° C. The difference between the respective overall temperature changes of the air and heating gas arises from their different specific heats of 0.27 and 0.29 CHU/lb./° C. respectively. Thus three quarters of the total turbine air is indirectly heated through heat exchanging walls at the maximum allowable temperature.

The remainder of the turbine air is indirectly heated in the countercurrent flow heat exchanger 9 from a temperature of 400° C. to 750° C. by the heating gas discharged from the concurrent flow exchanger 8, which is consequently reduced from a temperature of 884° C. to 540° C., the wall temperature in the heat exchanger 9 falling from 800° C. at the gas inlet end to a much lower value of the approximate order of 450° C. at the gas outlet end. By reason of the lower mean wall temperature of the countercurrent flow heat exchanger 9 the heat exchange effected therein is less economical of space than that effected in the concurrent exchangers 6, 7 and 8, the exchanger 9 having relatively longer fluid flow paths to effect the same temperature change on a similar mass flow of turbine air. On the other hand, by reason of the comparatively low outlet temperature, 540° C., of the heating gas discharged from the countercurrent flow heat exchanger 9, the heat exchange effected therein has a very favourable influence on the economy, from the standpoint of heat conservation, of the entire fluid heater. A further economy in this connection is afforded by the transfer of heat in the economiser 13 from the heating gas at an initial temperature of 540° C. to the combustion supporting air supply initially at atmospheric temperature. Moreover since, at inlet to the economiser 13, these fluids will differ in pressure only by reason of losses in the combustion chambers 15, 16 and 17 and duct losses, a rotary regenerative heat exchanger may, as already stated, conveniently be employed as an economiser with the advantage of compactness known to be afforded by heat exchangers of that type.

It will be apparent that the design of fluid heater plant exemplified by that illustrated in Figure 1 is very flexible in that any number of combustion chamber and concurrent flow heat exchanger aggregates may be employed so as to accommodate any ratio of the mass flow rates of the heated and heating fluids greater than two. Moreover the countercurrent flow heat exchanger 9 could conveniently handle a mass flow of heated fluid amounting only to a substantial fraction of the mass flow of the heating fluid, so that a minimum value of the ratio of total mass flow rates of heated and heating fluids of one and three quarters or even one and a half may be accommodated.

Figure 2:
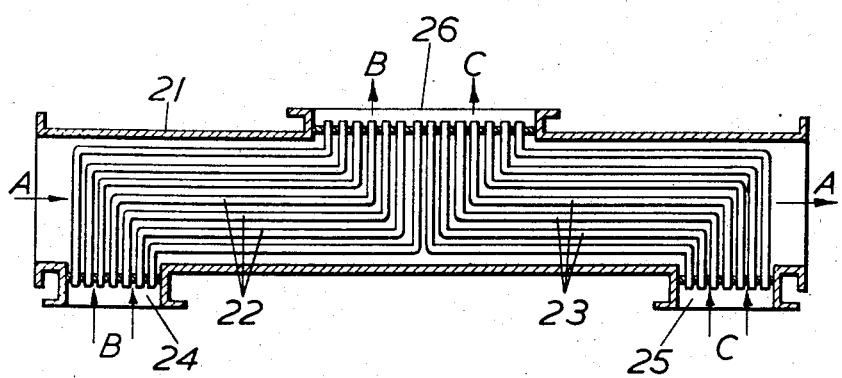
Figure 2 is a detailed cross view of certain components of the same fluid heater.

Figure 2 shows a longitudinal section in the general direction of flow of the heat exchanging fluids of a heat exchanger aggregate embodying the concurrent and countercurrent heat exchangers, 8 and 9 respectively, of Figure 1. The heat exchanger aggregate comprises a casing 21 affording a flow path (in the direction of arrow A) for the heating gas and, enclosed therein, two banks of tubes 22 and 23 constituting the heat exchanging walls of respectively the concurrent exchanger 8 and the countercurrent exchanger 9. Each tube has a central portion extending longitudinally in the direction of flow of the heating gas and two end portions extending laterally thereto. The turbine air enters the tube banks 22 and 23 through inlets 24 and 25 respectively disposed at opposite ends but on the same side of the casing 21, and leaves through an outlet 26 common to both banks of tubes disposed longitudinally between the inlets 24 and 25 but on the side of the casing 21 opposite thereto, as indicated by the arrows B and C respectively. The inlets 24 and 25 and the outlet 26 are each provided with a tube plate into which the end portions of the tubes are entered.

I claim:

1. The method of heating one fluid from another that comprises circulating a heating fluid in a path, applying heat to said fluid at spaced points along said path, circulating a stream of fluid to be heated, subdividing said stream into branches at least equal in number to the number of said points of heat application, and passing one subdivided stream in concurrent flow, heat exchange relationship to said heating fluid downstream of each of said points of heat application.

2. The method of heating one fluid from another that comprises circulating a heating fluid in a path, applying heat to said fluid at spaced points along said path, circulating a stream of fluid to be heated, subdividing said stream into branches at least one greater in number than the number of said points of heat application, passing one subdivided stream in concurrent flow, heat exchange relationship to said heating fluid downstream of each of said points of heat application, and passing a further subdivided stream in countercurrent flow, heat exchange relationship to said heating fluid downstream of the regions of concurrent flow heat exchange.

3. The method of heating one fluid from another that comprises circulating a heating fluid in a path, applying heat to said fluid at at least one point along said path, circulating a stream of fluid to be heated, subdividing said stream into at least two branches, passing one subdivided stream in concurrent flow, heat exchange relationship to said heating fluid downstream of said point of heat application, and passing a further subdivided stream in countercurrent flow, heat exchange relationship to said heating fluid downstream of the region of concurrent flow heat exchange.

4. The method of heating one fluid from another that comprises circulating a heating fluid in a path, applying heat at spaced points along said path, circulating a stream of fluid to be heated, passing at least a part of said stream in concurrent flow, heat exchange relationship to said heating fluid downstream of each of said points of heat application, and passing at least a part of said stream in countercurrent flow, heat exchange relationship to said heating fluid downstream of the regions of concurrent flow heat exchange.

5. The method of heating one fluid from another that comprises circulating a heating fluid in a path, applying heat at spaced points along said path, circulating a stream of fluid to be heated, and passing at least a part of said stream in concurrent flow, heat exchange relationship to said heating fluid downstream of each of said points of heat application.

6. Heat exchanging apparatus comprising a plurality of heat exchangers each having structure defining separate concurrent flow paths for two independent fluids and further defining at one end of said concurrent flow paths inlets and at the other end outlets for each of said fluids, a fluid supply manifold connected to the several inlets of one of said concurrent flow paths in each of the several heat exchangers, a fluid discharge manifold connected to the several outlets of the same concurrent flow paths in each of the several heat exchangers, and a plurality of fluid heater means including one for each of said heat exchangers each having a fluid inlet and outlet, there being provided in respect of each aggregate of heat exchanger and heater means a fluid transfer connection between the heater outlet and the inlet of the second of the said concurrent flow paths of the associated heat exchanger, and in respect of each successive pair of aggregates a second fluid transfer connection between the outlet of the second of said concurrent flow paths of the heat exchanger of one aggregate and the inlet of the heater means of the other aggregate.

7. Heat exchanging apparatus comprising a plurality of heat exchangers each having structure defining separate concurrent flow paths for two independent fluids and further defining at one end of said concurrent flow paths inlets and at the other end outlets for each of said fluids, a fluid supply manifold connected to the several inlets of one of said concurrent flow paths in each of the several heat exchangers, a fluid discharge manifold connected to the several outlets of the same concurrent flow paths in each of the several heat exchangers, and a plurality of fluid heater means including one for each of said heat exchangers each having a fluid inlet and outlet, there being provided in respect of each aggregate of heat exchanger and heater means a fluid transfer connection between the heater outlet and the inlet of the second of said concurrent flow paths of the associated heat exchanger, and in respect of each successive pair of aggregates a second fluid transfer connection between the outlet of the second of said concurrent flow paths of the heat exchanger of one aggregate and the inlet of the heater means of the other aggregate, said apparatus further comprising a heat exchanger having structure defining separate countercurrent flow paths for two independent fluids and further defining at one end of said countercurrent flow paths respectively an inlet and an outlet and the other end respectively an outlet and an inlet for the two fluids, a third fluid transfer connection between said fluid supply manifold and the inlet of one countercurrent flow path, a fourth fluid transfer connection between the outlet of the same countercurrent flow path and said fluid discharge manifold, and a fifth fluid transfer connection between the outlet of the second of said concurrent flow paths of the heat exchanger of said aggregate last in succession and the inlet of the second of said countercurrent flow paths.

8. Heat exchanging apparatus comprising at least one heat exchanger having structure defining separate concurrent flow paths for two independent fluids and further defining at one end of said concurrent flow paths inlets and at the other end outlets for each of said fluids, a second heat exchanger having structure defining separate countercurrent flow paths for two independent fluids and further defining at one end of said countercurrent flow paths respectively an inlet and an outlet and at the other end respectively an outlet and an inlet for the two fluids, a fluid supply manifold connected to the respective inlets of one of said concurrent and one of said countercurrent flow paths, a fluid discharge manifold connected to the respective outlets of the same concurrent and the same countercurrent flow path, a fluid heater means having an outlet for heated fluid, a first fluid transfer connection between said heater outlet and the inlet of the second concurrent flow path, and a second fluid transfer connection between the outlet of said second concurrent flow path and the inlet of the second countercurrent flow path.

References Cited in the file of this patent

UNITED STATES PATENTS

| | | |
|---|---|---|
| 2,268,270 | Traupel | Dec. 30, 1941 |
| 2,282,923 | Ambruster | May 12, 1942 |
| 2,345,950 | Salzman | Apr. 4, 1944 |
| 2,404,938 | Armacost et al. | July 30, 1946 |
| 2,471,123 | Rouy | May 24, 1949 |
| 2,632,297 | Ogston | Mar. 24, 1953 |
| 2,655,364 | Maldague | Oct. 13, 1953 |